Mar. 3, 1925.
E. B. TAYLOR
GLARE SHIELD
Filed Oct. 23, 1923
1,528,312
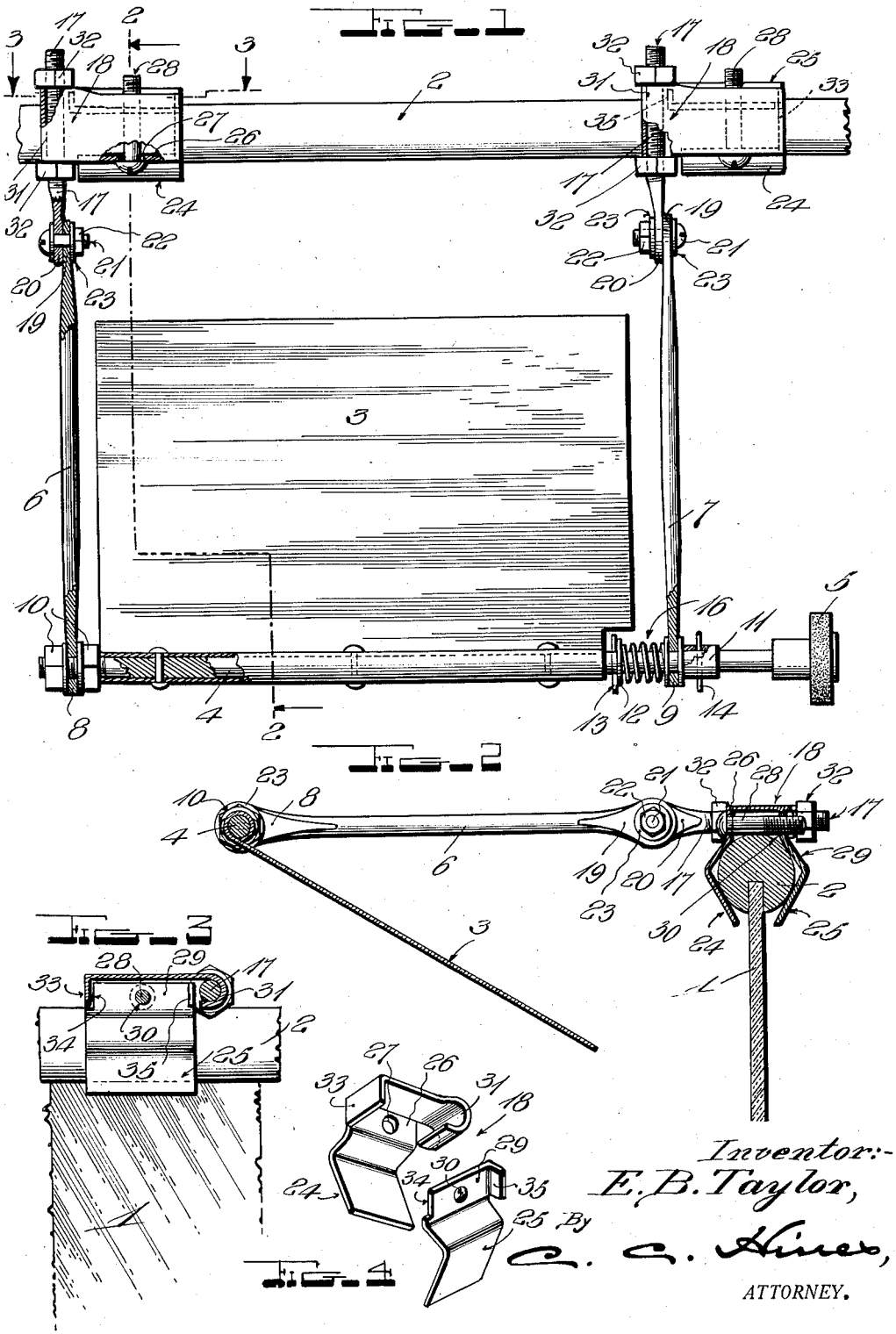
Inventor:-
E. B. Taylor,
By
C. C. Hines,
ATTORNEY.

Patented Mar. 3, 1925.

1,528,312

UNITED STATES PATENT OFFICE.

ELLIS B. TAYLOR, OF McCAMMON, IDAHO.

GLARE SHIELD.

Application filed October 23, 1923. Serial No. 670,255.

*To all whom it may concern:*

Be it known that I, ELLIS B. TAYLOR, a citizen of the United States, residing at McCammon, in the county of Bannock and State of Idaho, have invented new and useful Improvements in Glare Shields, of which the following is a specification.

This invention relates to glare shields for use on automobiles, for the purpose of shielding the driver of the automobile from the glare of the headlights of an approaching automobile in front, in order to avoid blinding the driver and to eliminate liability of collisions or accidents from this cause.

The primary object of the invention is to provide a glare shield which is simple, reliable and efficient in construction and operation, and which may be applied to the windshields of existing types of vehicles and adjusted for use as occasion requires to shield the eyes of the driver from glare, while at the same time leaving the roadway visible to the driver so that he can properly guide and control his vehicle.

A further object of the invention is to provide a glare shield capable of being mounted for use to suit conditions with respect to the vehicle on which it is to be used, and which embodies simple, reliable and efficient means for adjusting the shield plate thereof into and out of working position and for positively holding said shield plate against displacement, in any of its positions of adjustment.

The invention consists of the features of construction, combination and arrangement of parts, hereinafter fully described and claimed, reference being had to the accompanying drawing, in which:—

Figure 1 is a top plan view of a portion of a windshield and the glare shield applied thereto, showing the shield plate in retracted position and parts of the glare shield in section.

Figure 2 is a vertical section on the line 2—2 of Figure 1, showing the shield plate adjusted to one of its working positions.

Figure 3 is a detail section on the line 3—3 of Figure 1.

Figure 4 is a view of the members of one of the clamping devices, separated from each other.

Referring now more particularly to the drawing, 1 designates a portion of the glass windshield of an automobile or like vehicle, and 2 the upper cross rail or bar thereof to which the glare shield is applied.

The glare shield comprises a shield plate 3, of rectangular or oblong rectangular or other suitable form, and made of metal, colored glass or other suitable translucent or opaque material. This plate 3 is secured at one of its longitudinal edges to a rotary shaft 4 having at one end an operating handle or knob 5. The shaft 4 forms part of a swinging frame including a pair of parallel frame arms 6 and 7, between which the plate 3 is adapted to swing on the shaft 4 as an axis, said bracket arms 6 and 7 being provided at their rear ends with eyes 8 and 9 respectively. The shaft 4 is journaled at one end in the eye 8 of bracket arm 6 and adjacent to its opposite end in the eye 9 of the bracket arm 7. The end of the shaft which passes through the eye 8 is threaded to receive nuts 10 bearing against opposite sides of said eye and holding the shaft against endwise displacement. The opposite end of the shaft, which passes through the eye 9, is provided with an abutment sleeve 11 bearing against the outer side of the eye 9 and has disposed thereon, between the eye 9 and the adjacent edge of the shield plate 3, a washer 12 secured in position against inward endwise movement by a cotter pin or key 13 passing through the shaft, a similar pin or key 14 being passed through the shaft and collar 11 to hold said collar in position. A coiled spring 16 surrounds the shaft between the eye 9 and washer 12 and is held in compressed condition between the same, said spring exerting its expansive energy to hold the eye 9 pressed against the friction collar 11. A spring actuated friction lock is thus provided for normally clamping the shaft 4 against rotation to and between the bracket arms 6 and 7, while permitting said shaft 4 to be turned or rotated by means of the knob 5 to swing the shield plate 3 to various positions and to hold the same and the shaft positively in any of the positions to which they may be adjusted.

The bracket arms 7 are coupled at their forward ends to rods 17 carrying clamping devices 18 to engage the rail 2 and thereby fasten the glare shield in working position thereon. As shown, the forward ends of the arms 6 and 7 are provided with eyes 19 arranged in lapping relation to similar eyes 20 on the rear ends of the rods 17, bolts 21 provided with nuts 22 passing through said eyes and through clamping washer 23, whereby the frame arms 6 and 7 are adapted to be firmly and rigidly coupled to the rods 17. This connection between the frame arms 6 and 7 and the rods 17 also provides a pivotal coupling between the clamp carrying rods and the swinging frame of which the bracket arms 6 and 7 form a part, whereby said swinging frame, through pivotal movements of the arms 6 and 7, may be adjusted to dispose the glare shield 3 at a proper working point on the vehicle as occasion may require, after which the swinging frame may be permanently fixed in set position for use by tightening the bolts 21. This construction adapts the clamping devices 18 to be applied to the top rail of the windshield of any particular vehicle and the supporting frame of the glare shield to be preliminarily adjusted and mounted on the vehicle to suit any conditions peculiar to the particular vehicle on which the device is used.

Each clamping device 18 comprises a pair of clamping members 24 and 25 suitably formed to partially embrace and engage opposite sides of the rail 2. The clamping member 24 is formed with a body portion 26 having an opening 27 for passage of a clamping bolt 28, and the clamping member 25 is provided with a body portion 29 having a threaded opening 30 to receive the threaded shank of the bolt, whereby, through the medium of the bolt 28, the clamping members may be adjusted and firmly held in gripping engagement with the rail 2. The body of the clamping member 24 is formed at one side with a partially circular clip 31 to receive the threaded surface of the rod 17 which is provided with retaining nuts 32 to secure it against displacement and to hold the clamping device fastened as a unit thereto. At its side opposite the clip 31 the member 24 is formed with a flange 33, and the body portion of the clamping member 25 is formed at one side with a notch or recess 34 to accommodate and engage said flange, while at its opposite side the body portion 29 is provided with a lug 35 to bear against the portion of the rod 17 held in the clip 31, by means of which the body 29 of clamping member 25 is positively engaged at its opposite sides with the clamping member 24 and the rod 17 so that the clamping members will be positively held against any tendency to tilting motion on the bolt 28 and the rod 17 is thereby held firmly fixed in position.

In practice the glare shield is applied, as above-described, to the upper bar or rail 2 of the windshield 1 at one side of the vehicle in line with the driver's seat, the bracket arms 6 and 7 being horizontally arranged at such a level as to be in an out-of-the-way position. The arrangement is also such that the shield plate 3 will be supported so that it may be swung up to a horizontal position between the bracket arms in an out-of-the-way position until it is required for use. As shown in Figure 2, the shield plate 3 may be swung downwardly to a greater or less extent, and to different angles, so as to come to a greater or less degree in advance of the line of vision of the driver and between the eyes of the driver and the windshield, so that it will be interposed between the eyes of the driver and the blinding glare of the headlights of an approaching automobile in front. The shield plate is comparatively small, however, and when so adjusted, while cutting out the blinding rays of light, does not hide the roadway between the two automobiles or at the side of the approaching automobile, thus leaving most of the roadway visible to the driver under and at the sides of the shield plate 3, allowing him to properly guide and control his vehicle while shielded from the direct glare of light from the approaching vehicle. The shield plate 3 may be adjusted to different working positions within a range of 90° between the horizontal and vertical, so that the driver may regulate its shielding action according to the extent of the glare from the approaching vehicle or its distance from his vehicle, as circumstances or conditions may require, allowing him to properly position the shield plate to cut out all blinding light while leaving the roadway exposed to the fullest possible degree according to circumstances. As the friction clamp of which spring 16 forms a part will hold the shield plate 3 in any of the positions to which it will be adjusted against jolts or vibrations of the vehicle, it will be apparent that, after making the proper adjustments, the operator may feel secure in leaving the shield plate in position and concentrating his attention strictly to the guidance and control of the vehicle. Through the adjustment afforded by the pivotal connection of the swinging frame with the supporting rods 17, the device may be initially mounted to suit any conditions inherent to the particular vehicle to which it is applied, and thereafter it is simply necessary for the driver to adjust the shield plate 3 into any of its required working positions by simple manipulation of the knob 5 in order to ward off the glare from an approaching vehicle to any extent desired. As the shield plate 3 may be swung upward to a horizontal position between the bracket arms 6 and 7 it will be apparent that when the shield plate is not in operation it will be disposed in a position where it will not cause inconvenience, annoyance or interference with the manipulation of the windshield or movements of the driver in getting into or out of the vehicle. The pivotal connection between the frame arms and the rods 15 also adapts the swinging frame and shield plate to be folded in close compass for packing in storage or transportation, as will be readily understood.

From the foregoing description, taken in connection with the drawing, the construction and mode of operation of my improved glare shield will be readily understood and it will be seen that the invention provides a device of this character which is simple of construction, capable of being applied to suit any working condition on the vehicle and adapted to be readily and conveniently adjusted for use or moved back to an inoperative position, in which position it will occupy a non-interfering position. The merits and advantages of the device in other respects will be apparent from the foregoing description, to those versed in the art.

Where the conditions are such that the glare shield can not be mounted upon the frame of a windshield, as herein disclosed, the clamps may be omitted and holes bored in the windshield glass or through the top of the cab part of a car and the bolts 17 and nuts 32 employed for fastening the device in position.

Having thus fully described my invention, I claim:—

1. In a glare shield for automobiles, a pair of clamps to engage the windshield frame, each clamp comprising two members having clamping surfaces to engage a windshield frame bar and provided with body portions having bolt receiving openings, the body portions of said members being provided each with a side flange, said flanges closing opposite sides of the clamp and the body portion of one member having a part overhanging and closing the space between said side flanges and provided with a partially circular clip disposed in parallel relation to and having its open side closed by the side flange of the other member, a bolt engaging the bolt receiving openings of each clamp and uniting the members thereof, supporting rods engaging the clips of the bracket members, arms pivoted to said rods, a shaft journalled in the arms, and a glare shield carried by said shaft.

2. In a glare shield, a pair of fixed supporting rods, a pair of arms hinged at their forward ends to said rods and provided at their rear ends with eyes, a shaft journaled at one end in the eye of one of said rods and having its opposite end journaled in the eye of the other rod and extending beyond said rod, means on the extended end of the shaft for rotating the same, a shield plate fixed to the shaft between the arms, inner and outer abutment members on the shaft and bearing against the opposite sides of the eye of the arm in which said extended end of the shaft is journaled, a sleeve fixed to the shaft and engaging the outer abutment member, a third abutment member fixed to the shaft between the shield and inner abutment member, and a coiled spring encircling the shaft between said third abutment member and the said inner abutment member and forcing the latter in frictional binding contact with the eye of the arm against which it bears.

In testimony whereof I affix my signature.

ELLIS B. TAYLOR.